(No Model.)

W. A. BISSELL
WABBLING SAW.

No. 563,123. Patented June 30, 1896.

Witnesses
John Donnie
Robert Everett

Inventor
William A. Bissell.
By Wood & Boyd
his Attorneys

UNITED STATES PATENT OFFICE.

WILLIAM A. BISSELL, OF NEWPORT, KENTUCKY.

WABBLING SAW.

SPECIFICATION forming part of Letters Patent No. 563,123, dated June 30, 1896.

Application filed September 23, 1895. Serial No. 563,369. (No model.)

*To all whom it may concern:*

Be it known that I, WILLIAM A. BISSELL, residing at Newport, in the county of Campbell and State of Kentucky, have invented certain new and useful Improvements in Wabbling Saws, of which the following is a specification.

The object of my invention is to provide means for adjusting wabbling saws which are mounted upon an axis adapted to be inclined transversely to the axis of the saw-arbor.

Another object of my invention is to employ two such saws, each one having a segment of the toothed periphery provided with cross-cut teeth opposite the axial line of the saw-axis, and the companion saw having similar teeth upon the opposite segment of the periphery, so that when adjusted to one position the saws will move eccentrically in opposite planes, projecting the cross-cut teeth beyond the plane of its companion saw, whereby the extreme eccentric portions of the two saws armed with the cross-cut teeth are adapted to cut gains across the grain of the wood. Again, when the saws are reversed in position the cross-cut teeth are retracted and the ripping-teeth occupy extremes of the opposing eccentrics and the saw is adapted to cut gains or grooves in the direction of the grain of the wood.

Another object of my invention is to provide devices for adjusting the saws readily and positively to any desired angle to the plane of the arbor-axis.

The features of my invention will be more fully set forth in the description of the accompanying drawings, making a part of this specification, in which—

Figure 1:
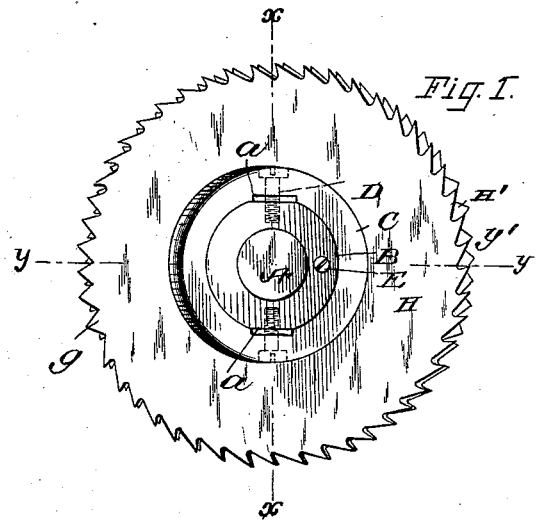
Figure 2:
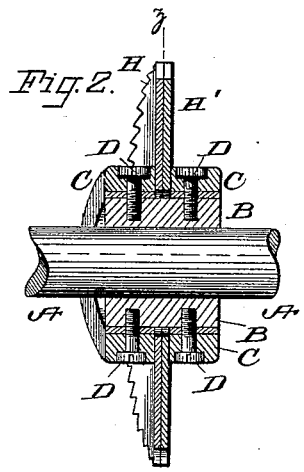
Figure 4:
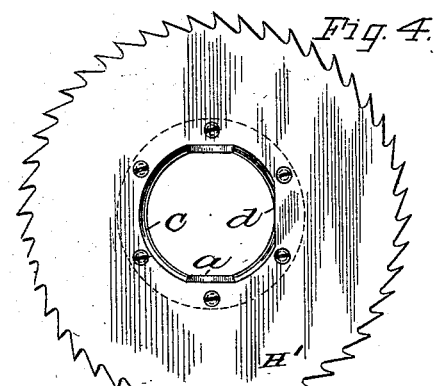
Figure 3:
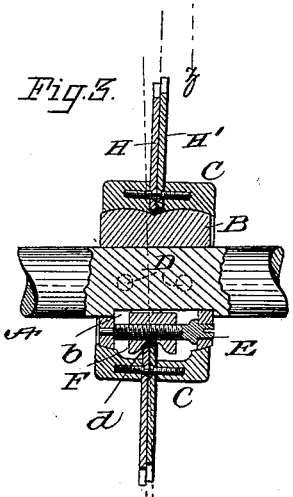
Figure 5:
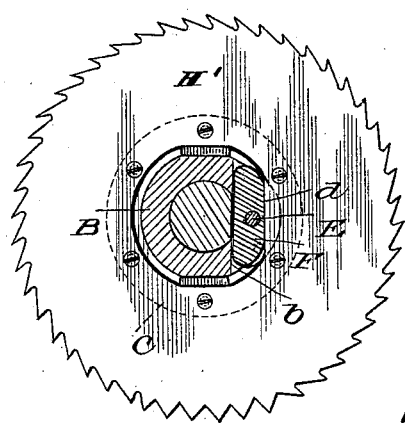

Figure 1 is a perspective view of my improvement with the cross-cut teeth projected for sawing across the grain. Fig. 2 is a central vertical section, partly in section, on line $xx$, Fig. 1. Fig. 3 is a central horizontal section of Fig. 2 on line $yy$, Fig. 1. Fig. 4 is a plan view of the saws. Fig. 5 is a vertical cross-section on the line $zz$ of Fig. 2.

A represents the saw-arbor; B, a hub secured to the arbor in any desired manner. It may be formed integral or be of sleeve construction.

C represents pivotal collars, to which the saws are secured, preferably, by screws $c$.

D represents pivotal screws on which the collars C turn to provide the angular adjustment of the saws.

In the preferred form of construction the hubs B have a flattened portion or segment $a$ upon their peripheral faces opposite the pivotal screws D. In the preferred form of construction the pivotal collars C, to each of which the saws are respectively secured, are held in position by means of an adjusting-screw E and adjusting-block F, sliding in the recess $b$ formed in the hub B, as shown in Fig. 3. Said block F is notched to embrace the straight edges $d$ of the saws and hold and adjust the saw-blades H H'. The contact-faces of the collars C and the hub B are circular in cross-section, as shown in Fig. 3, their curved faces being represented by arcs of circles struck from the centers of the bolts D, as illustrated in Fig. 3, thereby allowing the collar C to turn on the periphery of hub B, allowing the angular adjustment of said collar C and yet having a firm and secure seat upon the hub B at any lateral angle of adjustment.

It will be observed in Fig. 1 that the cross-cut teeth $g$ on the saw H are projected beyond the rip-teeth of the opposite saw, and that the teeth $g'$ on the saw H' are projected beyond the rip-teeth of saw H, so that these projected portions of cross-cut teeth will mark the outer plane or boundary of the grooves and the teeth between these points will remove the material between the outer boundaries of the gains. Thus I am enabled to make a smooth cut across the grain, and when the saw is adjusted in the opposite position the rip-teeth are projected for work with the grain of the wood.

Several advantages are obtained by the use of this method of adjustment of the wabbling saw. First, by the use of the grooved collars C, journaling upon the convex face of hub B, the saws have a firm seat at any angle of adjustment. Second, a much wider angle of adjustment can be obtained with this than with other means hitherto employed. Third, by employing the sliding block F and the adjusting-screw E the saws may be readily adjusted to any desired angle of inclination and positively maintained in that position. I believe I am the first to use companion saws each having two kinds of teeth adapted to be respectively projected to work across or with the grain as the occasion may require.

When a single saw is adjusted angularly to the perpendicular line of its axis, it is out of a true circle with reference to that line, but when two saws are employed the projecting teeth $g$ on one saw and $g'$ of the opposite saw, taken together, form a true circle, so that a part of the work is done with one saw and part with the other, and this is a material improvement over the operation of a single saw.

It will be observed that the screws D perform two functions—they secure the collars C to the hub B, which is really a radial extension of the arbor-shaft, and they also serve as the pivot-points for the angular adjustment of the saws.

I claim—

1. In a wabbling saw in combination with a hub secured to the arbor and having a convex outer periphery, concave collars pivotally connected to the arbor-hub by screws, saws secured to the inner faces of said collars and provided with openings having a straight boundary-line seating in an adjusting device in a recess formed in said collars, substantially as specified.

2. In combination with a saw-arbor having a hub with a convex outer periphery having flat sides $a$, two collars secured thereto by pivotal screws D, two saws secured to the inner faces of said collars each of which is provided with a section of cross-cut teeth at right angles to the pivotal points of said collars, and means for adjusting the saws in angular planes, substantially as specified.

3. In combination with a saw-arbor a hub secured thereto provided with a concave periphery, collars C, C; pivotal fastening-screws D, D; saws H, H; secured to the inner faces of said collars, an adjusting-block F located in a recess formed in one side of said collars, and means for moving said block laterally to secure any desired angular adjustment of the saws, substantially as specified.

4. The combination of a saw-arbor, a hub thereon, adjusting-collars pivotally connected to said hub, two saws connected to said collars and each having rip-teeth and a section of cross-cut teeth at right angles to the pivotal points of said collars and means for adjusting the saws angularly in either direction to project either the rip or cross-cut teeth, substantially as described.

5. The combination of a saw-arbor, a hub thereon, adjusting-collars pivotally connected to said hub, two saws connected to said collars and each having rip-teeth and a section of cross-cut teeth at right angles to the pivotal points of said collars, a sliding block arranged in a recess in the hub and engaging the inner edges of the saws, and an adjusting-screw journaled in the hub and passing through a threaded aperture in the block, substantially and for the purpose specified.

In testimony whereof I have hereunto set my hand.

WILLIAM A. BISSELL.

Witnesses:
W. R. WOOD,
OLIVER B. T. KAISER.